United States Patent
Yang et al.

(10) Patent No.: US 9,190,104 B2
(45) Date of Patent: Nov. 17, 2015

(54) SYSTEMS AND METHODS FOR DATA RETRY USING AVERAGING PROCESS

(71) Applicant: LSI Corporation, San Jose, CA (US)

(72) Inventors: Shaohua Yang, San Jose, CA (US); Kapil Gaba, Fremont, CA (US); Yoon L. Liow, San Ramon, CA (US); Xuebin Wu, San Jose, CA (US); Qi Zuo, Shanghai (CN); YuQing Yang, Shanghai (CN); Lei Wang, Shanghai (CN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 350 days.

(21) Appl. No.: 13/802,627

(22) Filed: Mar. 13, 2013

(65) Prior Publication Data
US 2014/0172934 A1    Jun. 19, 2014

Related U.S. Application Data

(60) Provisional application No. 61/736,855, filed on Dec. 13, 2012.

(51) Int. Cl.
*G06F 17/10* (2006.01)
*G11B 20/10* (2006.01)

(52) U.S. Cl.
CPC .................. *G11B 20/10046* (2013.01)

(58) Field of Classification Search
CPC ... H03H 17/06; H03H 17/0294; H03H 17/02; H03H 17/04; H03H 17/0223
USPC ........................................................ 708/300
See application file for complete search history.

(56) References Cited

U.S. PATENT DOCUMENTS

| | | |
|---|---|---|
| 5,701,314 A | 12/1997 | Armstrong |
| 5,712,861 A | 1/1998 | Inoue |
| 5,797,020 A | 8/1998 | Bonella et al. |
| 6,185,620 B1 | 2/2001 | Weber et al. |
| 6,405,342 B1 | 6/2002 | Lee |
| 6,438,717 B1 | 8/2002 | Butler |
| 6,657,803 B1 | 12/2003 | Ling |
| 7,076,719 B2 | 7/2006 | Anjo et al. |
| 7,136,244 B1 | 11/2006 | Rothberg |

(Continued)

FOREIGN PATENT DOCUMENTS

| | | |
|---|---|---|
| EP | 2242054 A2 | 10/2010 |
| WO | WO 2008/087042 A1 | 7/2008 |
| WO | WO 2011/091845 A1 | 8/2011 |

OTHER PUBLICATIONS

Chase, D, "A Class of Algorithms for Decoding Block Codes with Channel Measurement Information" IEEE Transactions on Info theory, vol. 18, No. 1 Jan. 1, 1972.

(Continued)

*Primary Examiner* — Tan V. Mai

(57) ABSTRACT

Embodiments are related to systems and methods for data processing, and more particularly to systems and methods for calibration during data processing. As an example, a data processing system is discussed that includes a sample averaging circuit operable to average digital samples from an analog to digital converter circuit over multiple instances of an analog input to yield an X-average output, and a selector circuit operable to select one of the digital samples or the X-average output as a processing output.

20 Claims, 4 Drawing Sheets

(56) References Cited

U.S. PATENT DOCUMENTS

| | | | |
|---|---|---|---|
| 7,702,989 | B2 | 4/2010 | Graef |
| 7,730,384 | B2 | 6/2010 | Graef |
| 7,738,201 | B2 | 6/2010 | Jin |
| 7,971,125 | B2 | 6/2011 | Graef |
| 7,990,642 | B2 | 8/2011 | Lee |
| 8,176,404 | B2 | 5/2012 | Yang |
| 2010/0191525 | A1* | 7/2010 | Rabenko et al. ............... 704/211 |
| 2010/0287420 | A1* | 11/2010 | Mathew et al. ................. 714/48 |
| 2011/0080211 | A1 | 4/2011 | Yang |
| 2011/0085628 | A1* | 4/2011 | Kaynak et al. ................ 375/350 |
| 2011/0161633 | A1 | 6/2011 | Xu |
| 2011/0164669 | A1* | 7/2011 | Mathew et al. ............... 375/227 |
| 2012/0198129 | A1 | 8/2012 | Van Aken |
| 2012/0200954 | A1 | 8/2012 | Jin |
| 2012/0236429 | A1 | 9/2012 | Yang |

OTHER PUBLICATIONS

Dong-U Lee et al "Pilotless Frame Synchronization via LDPC Code Constraint Feedback" IEEE Comm. Letters, NJ, US vol. 11 No. 8, Aug. 1, 2007.

Olmos et al., "Tree-Structure Expectation Propagation for LDPC Decoding in Erasure Channels", Cornell University Library arXiv:1009.4287 (Sep. 22, 2010).

U.S. Appl. No. 13/474,672, Unpublished (filed May 17, 2012) (Fan Zhang).

U.S. Appl. No. 13/465,214, Unpublished (filed May 7, 2012) (Chung-Li Wang).

U.S. Appl. No. 13/326,363, Unpublished (filed Dec. 15, 2011) (Fan Zhang).

U.S. Appl. No. 13/372,600, Unpublished (filed Feb. 14, 2012) (Shaohua Yang).

U.S. Appl. No. 13/326,367, Unpublished (filed Dec. 15, 2011) (Shaohua Yang).

U.S. Appl. No. 13/483,982, Unpublished (filed May 30, 2012) (Yang Han).

U.S. Appl. No. 13/412,492, Unpublished (filed Mar. 5, 2012) (Shaohua Yang).

U.S. Appl. No. 13/445,858, Unpublished (filed Apr. 12, 2012) (Johnson Yen).

U.S. Appl. No. 13/490,849, Unpublished (filed Jun. 7, 2012) (Johnson Yen).

U.S. Appl. No. 13/770,030, Unpublished (filed Feb. 19, 2013) (Chung-Li Wang).

U.S. Appl. No. 13/560,737, Unpublished (filed Jul. 27, 2012) (Weijun Tan).

U.S. Appl. No. 13/602,440, Unpublished (filed Sep. 4, 2012) (Fan Zhang).

U.S. Appl. No. 13/644,542, Unpublished (filed Oct. 4, 2012) (Shaohua Yang).

U.S. Appl. No. 13/644,589, Unpublished (filed Oct. 4, 2012) (Shaohua Yang).

U.S. Appl. No. 13/654,417, Unpublished (filed Oct. 18, 2012) (Fan Zhang).

U.S. Appl. No. 13/692,908, Unpublished (filed Dec. 3, 2012) (Fan Zhang).

U.S. Appl. No. 13/459,282, Unpublished (filed Apr. 30, 2012) (Fan Zhang).

* cited by examiner

SYSTEMS AND METHODS FOR DATA RETRY USING AVERAGING PROCESS

CROSS REFERENCE TO RELATED APPLICATIONS

The present application claims priority to (is a non-provisional application of) U.S. Prov. App. No. 61/736,855 entitled "Systems and Methods for Data Retry Using Averaging Process", and filed Dec. 13, 2012 by Yang et al. The entirety of the aforementioned reference is incorporated herein by reference for all purposes.

BACKGROUND

Embodiments are related to systems and methods for data processing, and more particularly to systems and methods for calibration during data processing.

Various data transfer systems have been developed including storage systems, cellular telephone systems, and radio transmission systems. In each of the systems data is transferred from a sender to a receiver via some medium. For example, in a storage system, data is sent from a sender (i.e., a write function) to a receiver (i.e., a read function) via a storage medium. In some cases, the data processing function receives data sets and applies a data detection algorithm and a data decode algorithm to the data sets to recover an originally written data set. In some cases, media or other defects are encountered that make recovering the originally written data difficult if not impossible.

Hence, for at least the aforementioned reasons, there exists a need in the art for advanced systems and methods for data processing.

BRIEF SUMMARY

Embodiments are related to systems and methods for data processing, and more particularly to systems and methods for calibration during data processing.

Various embodiments of the present invention provide data processing systems that include: an analog to digital converter circuit, a sample averaging circuit, a selector circuit, an equalizer circuit, and a data processing circuit. The analog to digital converter circuit is operable to convert an analog input into a corresponding series of digital samples based at least in part on a conversion parameter. The sample averaging circuit is operable to average the digital samples over multiple instances of analog input to yield an X-average output. The selector circuit is operable to select one of the digital samples or the X-average output as processing output. The equalizer circuit is operable to equalize the processing output to yield a Y-sample output based at least in part on an equalizer coefficient. The data processing circuit is operable to process the Y-sample output to recover a data set represented in the analog input based at least in part on a noise predictive filter coefficient.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION

Embodiments are related to systems and methods for data processing, and more particularly to systems and methods for calibration during data processing.

Various embodiments of the present invention provide for data processing systems that include X-averaging circuitry and various calibration circuitry. The calibration circuitry is utilized over a number of phases to adjust adaptable parameters using averaged data sets. Such calibration circuitry may be used, for example, during a retry process after standard processing failed to yield an original data set.

Various embodiments of the present invention provide data processing systems that include: an analog to digital converter circuit, a sample averaging circuit, a selector circuit, an equalizer circuit, and a data processing circuit. The analog to digital converter circuit is operable to convert an analog input into a corresponding series of digital samples based at least in part on a conversion parameter. The sample averaging circuit is operable to average the digital samples over multiple instances of analog input to yield an X-average output. The selector circuit is operable to select one of the digital samples or the X-average output as processing output. The equalizer circuit is operable to equalize the processing output to yield a Y-sample output based at least in part on an equalizer coefficient. The data processing circuit is operable to process the Y-sample output to recover a data set represented in the analog input based at least in part on a noise predictive filter coefficient. In some instances of the aforementioned embodiments, the system is implemented as an integrated circuit. In various embodiments of the present invention, the data processing system is incorporated in a storage device, and in other embodiments of the present invention, the data processing system is incorporated in a data communication device.

In one or more instances of the aforementioned embodiments, the processing system further includes a phase based re-adaptation circuit operable to adapt the conversion parameter, the equalizer filter coefficient, and the noise predictive filter coefficient. The conversion parameter is adapted while the analog input is being received and while the equalizer coefficient and the noise predictive filter coefficient are fixed. The equalizer filter coefficient is adapted based on the X-average output, and the noise predictive filter coefficient is adapted based on the Y-sample output. In some such cases, the X-average output is fixed while the noise predictive filter coefficient is adapted.

Figure 1:
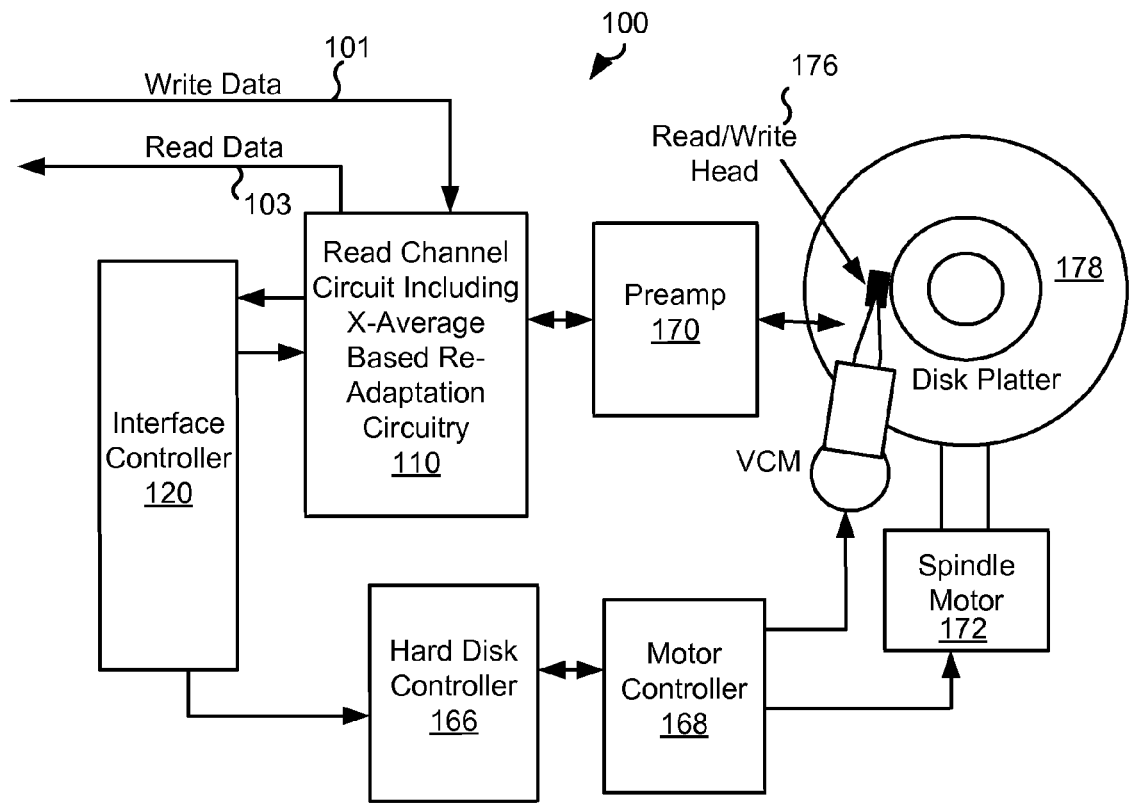
FIG. 1 shows a storage system including X-average based re-adaptation circuitry is shown in accordance with various embodiments of the present invention.

Turning to FIG. 1, a storage system 100 including a read channel circuit 110 having X-average based re-adaptation circuitry is shown in accordance with various embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 176 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103.

As part of processing data accessed from disk platter 178, read channel circuit 110 performs a standard data processing on a received data input using a data detector circuit and a data decoder circuit. Where the data processing fails to converge (i.e., yield the originally written data set), a retry process is started that includes a multi-phase re-adaptation of various circuit parameters using an X-average input. In some cases, read channel circuit 110 may include a data processing circuit similar to that discussed below in relation to FIG. 3, and/or may apply data processing similar to that discussed below in relation to FIGS. 4a-4b.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 100 may be modified to include solid state memory that is used to store data in addition to the storage offered by disk platter 178. This solid state memory may be used in parallel to disk platter 178 to provide additional storage. In such a case, the solid state memory receives and provides information directly to read channel circuit 110. Alternatively, the solid state memory may be used as a cache where it offers faster access time than that offered by disk platter 178. In such a case, the solid state memory may be disposed between interface controller 120 and read channel circuit 110 where it operates as a pass through to disk platter 178 when requested data is not available in the solid state memory or when the solid state memory does not have sufficient storage to hold a newly written data set. Based upon the disclosure provided herein, one of ordinary skill in the art will recognize a variety of storage systems including both disk platter 178 and a solid state memory.

Figure 2:
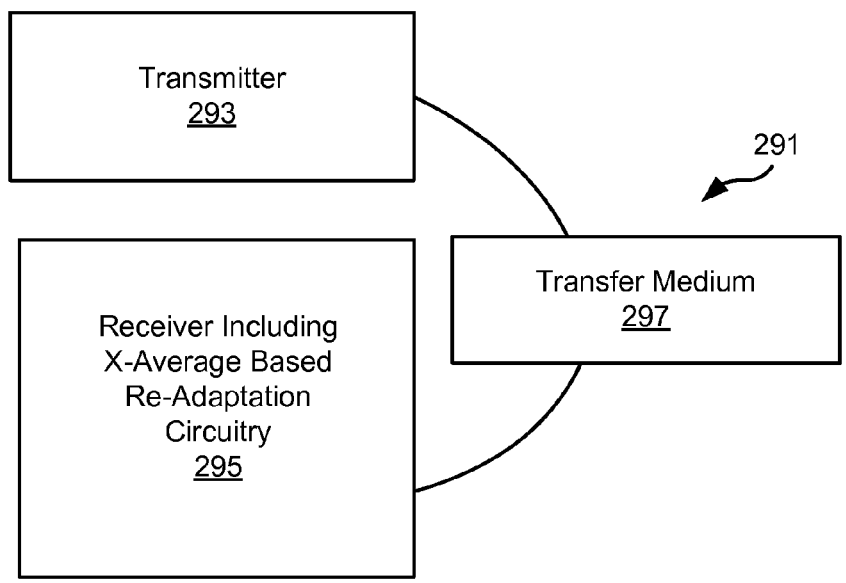
FIG. 2 depicts a data transmission system including X-average based re-adaptation circuitry in accordance with one or more embodiments of the present invention.

Turning to FIG. 2, a data transmission system 291 including a receiver 295 having X-average based re-adaptation circuitry is shown in accordance with various embodiments of the present invention is shown in accordance with various embodiments of the present invention. Data transmission system 291 includes a transmitter 293 that is operable to transmit encoded information via a transfer medium 297 as is known in the art. The encoded information is received from transfer medium 297 by a receiver 295. Receiver 295 processes a received input representing the encoded information to yield the originally transmitted data.

As part of processing data received by receiver 295, a processing circuit performs a standard data processing on a received data input using a data detector circuit and a data decoder circuit. Where the data processing fails to converge (i.e., yield the originally written data set), a retry process is started that includes a multi-phase re-adaptation of various circuit parameters using an X-average input. In some cases, receiver 295 may include a data processing circuit similar to that discussed below in relation to FIG. 3, and/or may apply data processing similar to that discussed below in relation to FIGS. 4a-4b.

Figure 3:
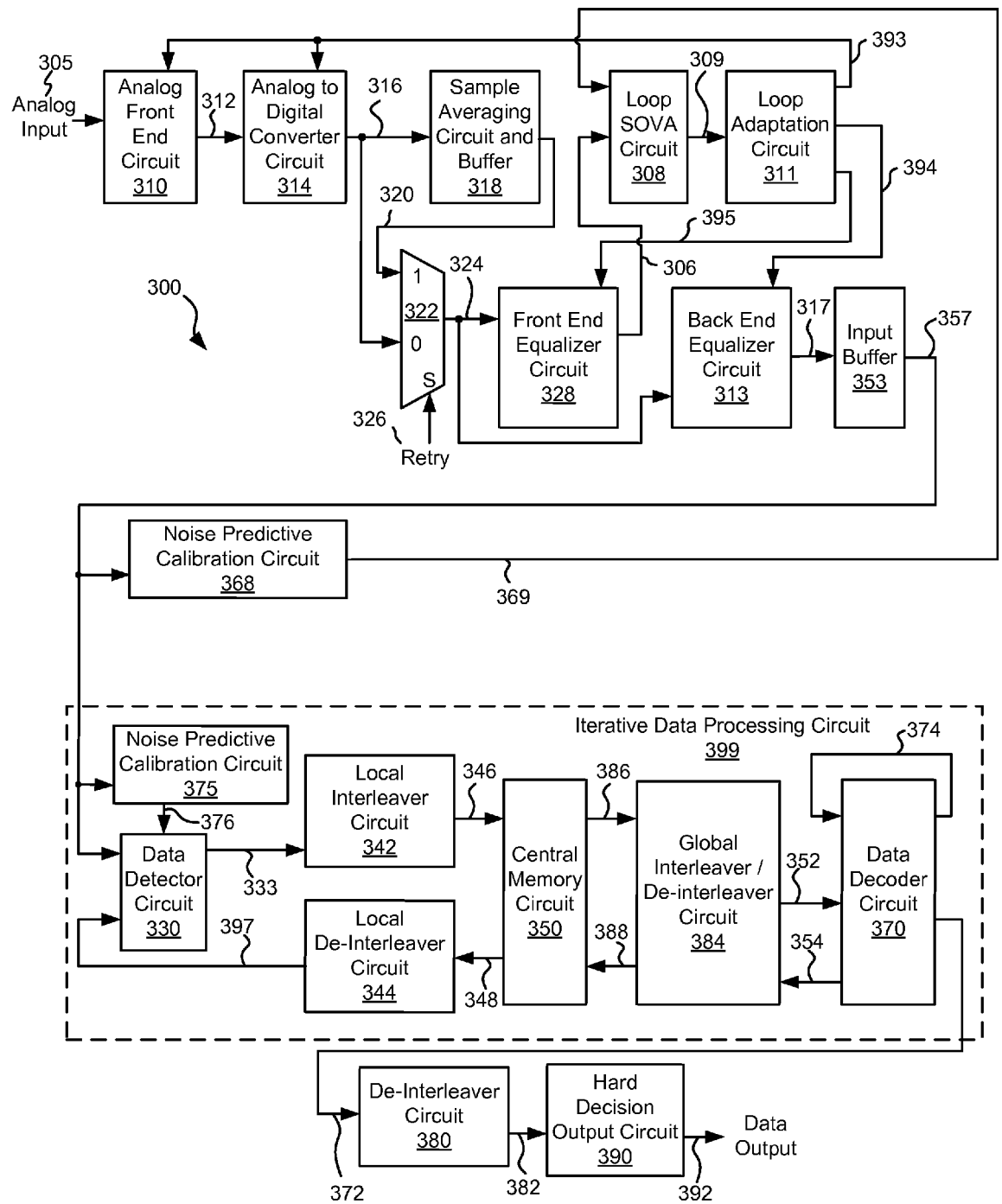
FIG. 3 shows a data processing circuit including X-average based re-adaptation circuitry in accordance with some embodiments of the present invention.

Turning to FIG. 3, a data processing circuit 300 including X-average based re-adaptation circuitry is shown in accordance with some embodiments of the present invention. Data decoding circuit 300 includes an analog front end circuit 310 that receives an analog signal 305. Analog front end circuit 310 processes analog signal 305 and provides a processed analog signal 312 to an analog to digital converter circuit 314. Analog front end circuit 310 may include, but is not limited to, an analog filter and an amplifier circuit as are known in the art. Based upon the disclosure provided herein, one of ordinary skill in the art will recognize a variety of circuitry that may be included as part of analog front end circuit 310. In some cases, analog signal 305 is derived from a read/write head assembly (not shown) that is disposed in relation to a storage medium (not shown). In other cases, analog signal 305 is derived from a receiver circuit (not shown) that is operable to receive a signal from a transmission medium (not shown). The transmission medium may be wired or wireless. Based upon the disclosure provided herein, one of ordinary skill in the art will recognize a variety of source from which analog input 305 may be derived. The processing applied by analog front end circuit 310 is governed at least in part by one or more parameters 393 provided from a loop adaptation circuit 311. Parameters 393 may include, for example, one or more filter settings used to govern operation of analog filtering applied by analog front end circuit 310.

Analog to digital converter circuit 314 converts processed analog signal 312 into a corresponding series of digital samples 316. Analog to digital converter circuit 314 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. The conversion applied by analog to digital converter circuit 314 is governed at least in part by one or more parameters 393 provided from loop adaptation circuit 311. Parameters 393 may include, for example, a sample timing parameter governing a phase and/or frequency of sampling applied by analog to digital converter circuit 314.

Digital samples 316 are provided to a sample averaging circuit 318 that averages a number of instances of digital samples 316 to yield an X-average output 320. This averaging is applied by repeatedly re-processing and re-sampling analog input 305 and averaging the resulting digital samples 316 with a prior X-averaged output 320. X-averaged output 320 and digital samples 316 are provided to a selector circuit 322. Selector circuit 322 selects one of digital samples 316 or X-averaged output 320 as an X-sample output 324 based upon a retry signal 326. When retry signal 326 is asserted as a logic '0', X-sample output 324 is the result of a physical re-read. In contrast, when retry signal 326 is asserted as a logic '1', X-sample output 324 is derived from previous re-reads.

During a physical re-read as indicated by retry signal 326, digital samples 316 are provided as X-sample output 324 to a front end equalizer circuit 328 that equalizes X-sample output 324 to yield an equalized output 306. In some embodiments of the present invention, front end equalizer circuit 328 is a digital finite impulse response filter as are known in the art. In such cases, the equalization applied by front end equalizer circuit 328 is governed at least in part based upon filter coefficients 395 provided from loop adaptation circuit 311. Thus, during a physical re-read, loop adaptation circuit 311 adapts filter coefficients 395, and loads the adapted filter coefficients 395 to front end equalizer 328. Equalized output 306 is provided to a loop soft output Viterbi algorithm (SOVA) detection circuit 308. A resulting detected output 309 is provided to a loop adaptation circuit 311 that is operable to adjust parameters 393, filter coefficients 394 and filter coefficients 395. The combination of loop SOVA detection circuit 308 and loop adaptation circuit 311 is known in the art. Based upon the disclosure provided herein, one of ordinary skill in the art will recognize a variety of circuits and/or algorithms that may be used to adapt parameters 393, filter coefficients 394, and filter coefficients 395 in accordance with different embodiments of the present invention. Of note, after a physical re-read, X-averaged output 320 is provided as X-sample output 324 to both a front end equalizer circuit 328 and back end equalizer circuit 313 where it is repeatedly used for adaptation of filter coefficients 394 and not filter coefficients 395 that remain fixed.

X-sample output 324 is additionally provided to a back end equalizer circuit 313 that equalizes the output to yield an equalized output 317. In some embodiments of the present invention, back end equalizer circuit 313 is a digital finite impulse response filter as are known in the art. In such cases, the equalization applied by back end equalizer circuit 313 is governed at least in part based upon filter coefficients 394 provided from loop adaptation circuit 311. Again, for re-adaptation after a physical re-read, X-averaged output 320 is provided as X-sample output 324 to back end equalizer circuit 313 where it is repeatedly used for adaptation of filter coefficients 394. The number of replays of X-averaged output 320 to obtain the appropriate adaptation may be programmable. After the number of replays has occurred, the final instance of equalized output 317 is stored to an input buffer 353. Input buffer 353 includes sufficient memory to maintain one or more codewords until processing of that codeword is completed through an iterative data processing circuit 399 (outlined by dashed lines) including, where warranted, multiple global iterations (passes through both a data detector circuit 330 and a data decoder circuit 370) and/or local iterations (passes through multi-level decoder circuit 399 during a given global iteration). An output 357 is provided to data detector circuit 330, a noise predictive calibration circuit 368, and a noise predictive calibration circuit 375.

Also, during a physical re-read, a noise predictive calibration circuit 368 adaptively updates noise predictive filter taps 369 that are provided to loop SOVA circuit 308. Noise predictive calibration circuit 368 may be any circuit known in the art that is capable of adaptively adjusting a control input to a data detector circuit. Based upon the disclosure provided herein, one of ordinary skill in the art will recognize a variety of types of calibration that may be performed in relation to different embodiments of the present invention. In contrast, during replay of X-averaged output 320 after the physical re-read, noise predictive calibration circuit 368 does not update coefficients 368. In sum, front end equalizer 328 and loop SOVA circuit 308 are adapted only as a physical read is ongoing using digital samples 316. In contrast, back end equalizer circuit 313 and a noise predictive calibration circuit provide adaptation during both the physical read using digitals samples 316 and after the physical read using X-averaged output 320.

Data detector circuit 330 may be a single data detector circuit or may be two or more data detector circuits operating in parallel on different codewords. Whether it is a single data detector circuit or a number of data detector circuits operating in parallel, data detector circuit 330 is operable to apply a data detection algorithm to a received codeword or data set. In some embodiments of the present invention, data detector circuit 330 is a Viterbi algorithm data detector circuit as are known in the art. In other embodiments of the present invention, data detector circuit 330 is a is a maximum a posteriori data detector circuit as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. In some cases, one data detector circuit included in data detector circuit 330 is used to apply the data detection algorithm to the received codeword for a first global iteration applied to the received codeword, and another data detector circuit included in data detector circuit 330 is operable apply the data detection algorithm to the received codeword guided by a decoded output accessed from a central memory circuit 350 on subsequent global iterations.

Upon completion of application of the data detection algorithm to the received codeword on the first global iteration, data detector circuit 330 provides a detector output 333. Detector output 333 includes soft data. As used herein, the phrase "soft data" is used in its broadest sense to mean reliability data with each instance of the reliability data indicating a likelihood that a corresponding bit position or group of bit positions has been correctly detected. In some embodiments of the present invention, the soft data or reliability data is log likelihood ratio data as is known in the art. Detected output 333 is provided to a local interleaver circuit 342. Local interleaver circuit 342 is operable to shuffle sub-portions (i.e., local chunks) of the data set included as detected output and provides an interleaved codeword 346 that is stored to central memory circuit 350. Interleaver circuit 342 may be any circuit known in the art that is capable of shuffling data sets to yield a re-arranged data set. Interleaved codeword 346 is stored to central memory circuit 350.

Once data decoder circuit 370 is available, a previously stored interleaved codeword 346 is accessed from central memory circuit 350 as a stored codeword 386 and globally interleaved by a global interleaver/de-interleaver circuit 384. Global interleaver/De-interleaver circuit 384 may be any circuit known in the art that is capable of globally rearranging codewords. Global interleaver/De-interleaver circuit 384 provides a decoder input 352 into data decoder circuit 370. Data decoder circuit 370 applies a data decoding algorithm to the received input to yield an interim decoded output 374. In some embodiments of the present invention, data decoder circuit 370 is a low density parity check decoder circuit as are known in the art. Based upon the disclosure provided herein, one of ordinary skill in the art will recognize a variety of data decoder circuits that may be used in relation to different embodiments of the present invention.

Where interim decoded output 374 fails to converge (i.e., fails to yield an originally written data set), it is determined whether another local iteration (i.e., another pass through data decoder circuit 370) is allowed. Where another local iteration is to be applied, interim decoded output 374 is provided as a feedback to data decoder circuit 370. This continues until either a maximum number of local iterations is exceeded or interim decoded output 374 converges (i.e., yields the originally written data set). Where data decoder circuit 370 is a low density parity check decoder circuit, such convergence of interim decoded output 374 is found where all of the parity check equations applied as part of the data decoding algorithm are satisfied.

Where interim decoded output 374 fails to converge and a number of local iterations through data decoder circuit 370 exceeds a threshold, the resulting interim decoded output is provided as a decoded output 354 back to central memory circuit 350 where it is stored awaiting another global iteration through a data detector circuit included in data detector circuit 330 that re-applies the data detection algorithm guided by a de-interleaved output 397 derived from a decoded output 354.

Prior to storage of decoded output 354 to central memory circuit 350, decoded output 354 is globally de-interleaved to yield a globally de-interleaved output 388 that is stored to central memory circuit 350. The global de-interleaving reverses the global interleaving earlier applied to stored codeword 386 to yield decoder input 352. When a data detector circuit included in data detector circuit 330 becomes available, a previously stored de-interleaved output 388 accessed from central memory circuit 350 and locally de-interleaved by a de-interleaver circuit 344. De-interleaver circuit 344 re-arranges decoder output 348 to reverse the shuffling originally performed by interleaver circuit 342. The resulting de-interleaved output 397 is provided to data detector circuit 330 where it is used to guide subsequent detection of a corresponding data set previously received as equalized output 317.

Alternatively, where interim decoded output 374 converges it is provided as an output codeword 372 to a de-interleaver circuit 380. De-interleaver circuit 380 rearranges the data to reverse both the global and local interleaving applied to the data to yield a de-interleaved output 382. De-interleaved output 382 is provided to a hard decision output circuit 390. Hard decision output circuit 390 is operable to re-order data sets that may complete out of order back into their original order, with the originally ordered data sets being provided as a data output 392.

In operation, retry signal 326 is initially asserted to select digital samples 316 as X-sample output 324, and all data processing is performed based upon digital samples 316 without any ongoing re-calibration of noise predictive filter taps 369, noise predictive filter taps 376, filter coefficients 394, filter coefficients 395, and parameters 393.

Where the data processing fails to converge, a retry condition is triggered including assertion of retry signal 326 to select X-average output 320 as X-sample output 324. In addition, updates of parameters 393, filter coefficients 395, and filter coefficients 395 from loop adaptation circuit 311 is enabled during a first phase of re-adaptation. This first phase includes allowing parameters 393, filter coefficients 394, and filter coefficients 395 to be re-adapted until a defined adaptation result is achieved. In addition, the re-read data received as equalized output 317 is stored to input buffer 353. During the first phase re-adaptation, operation of iterative data processing circuit 399 is disabled including noise predictive calibration circuit 375. In addition, during the first phase, filter coefficients 394 are not updated to back end equalizer circuit 313. Further, averaging of digital samples 316 by sample averaging circuit and buffer 318 is performed during the first phase.

Once the defined result of the first phase re-adaptation of parameters 393 is achieved, a second phase of adaptation begins. During the second phase, X-averaged output 320 is replayed for adaptation. In particular, front end equalizer 328 operates, but filter coefficients 395 are not updated. Rather, the values of filter coefficients 395 developed in phase 1 are used during the second phase. In contrast, back end equalizer 313 operates and filter coefficients 394 are updated. Noise predictive calibration circuit 368 does not update or transfer noise predictive filter taps 369 to loop SOVA circuit 308. The resulting equalized output 317 is stored to input buffer 353 for use in the subsequent stage.

After the second stage completes, operation of iterative data processing circuit 399 is enabled including noise predictive calibration circuit 375 that updates noise predictive filter taps 376 to data detector circuit 330 on each global iteration (i.e., pass through both data detector circuit 330 and data decoder circuit 370). A defined number of global iterations are run, and the result at the end of the global iterations is sent out. Phases one through three may be repeated a number of times. As the number of times increases, the noise included in X-averaged sample is averaged out. This results in an increase in the adaptation accuracy over time.

The above mentioned process may be augmented to include updating of targets for backend equalizer circuit 313 and data detector circuit 330. The first three phases are performed prior to modifying the targets. After the targets are changed, filter coefficients 394 for backend equalizer 313 and noise predictive filter taps 376 are readapted. After the targets are changed, multiple iterations of the second phase are performed. During the repetition of the second phase X-average output 320 is used by both back end equalizer circuit 313 and front end equalizer circuit 328. The values of filter coefficients 395 remain unchanged while the values of filter coefficients 394 are updated by loop adaptation circuit 311 during this second phase. Neither noise predictive calibration circuit 368 nor noise predictive calibration circuit 375 are updating noise predictive filter taps 369 or noise predictive filter taps 376, respectively, during the second phase. This second phase may be repeated a number of times.

During the third phase, noise predictive calibration circuit 375 adapts noise predictive filter taps 376 which are loaded to data detector circuit 330 at the end of a global iteration. A defined number of global iterations are performed while results are provided at the end of each global iteration. Phase three may be done using a virtual retry feature of data processing circuit 300. At the end of the third phase, it is determined whether the current targets are appropriate. Where they are not appropriate, a new set of targets is loaded, and the aforementioned processes of the second stage and the third stage are repeated for the new targets.

Figure 4A:
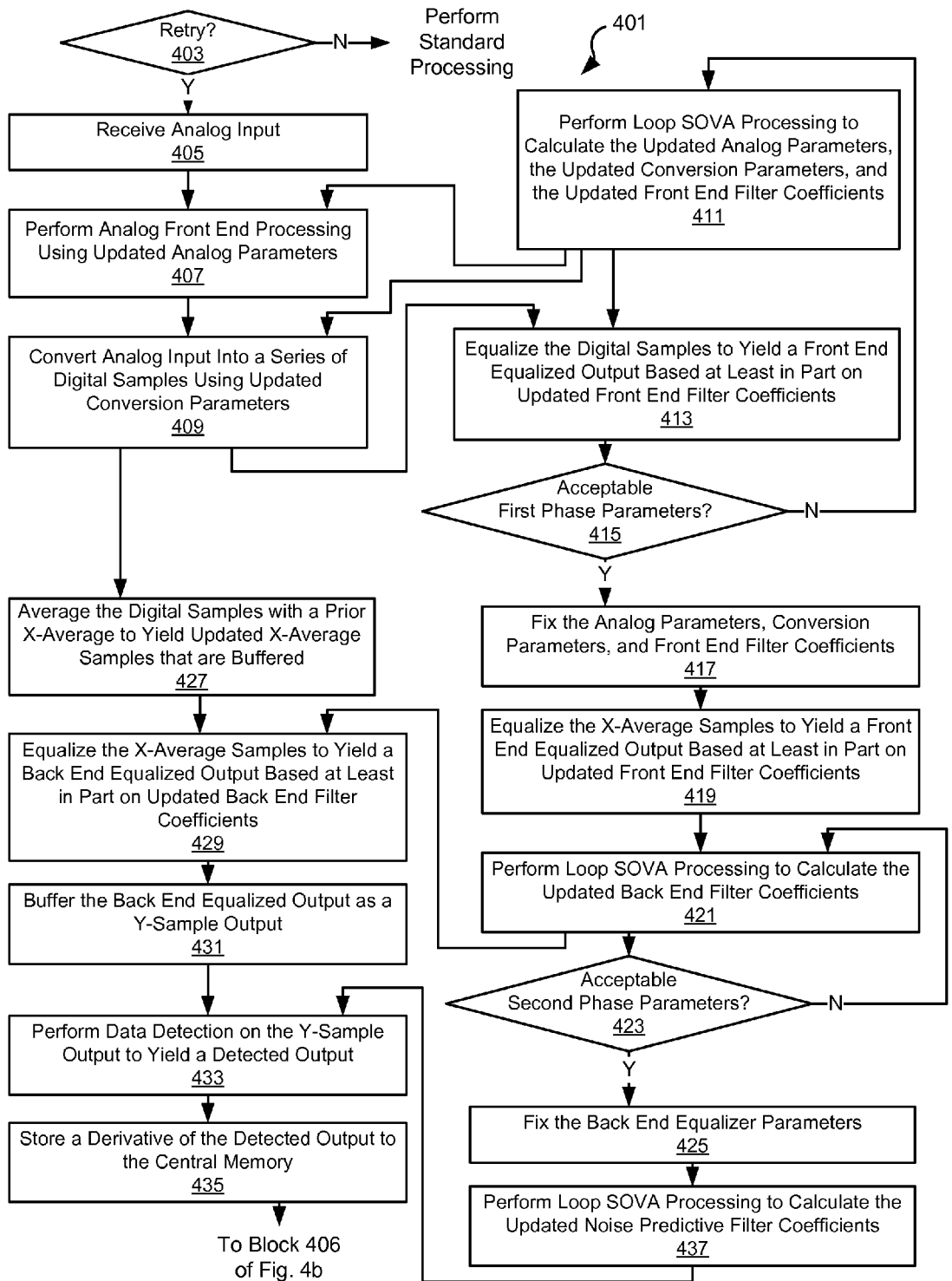
FIGS. 4a-4b are flow diagrams showing a method for data processing utilizing X-average based re-adaptation in accordance with some embodiments of the present invention.
Figure 4B:
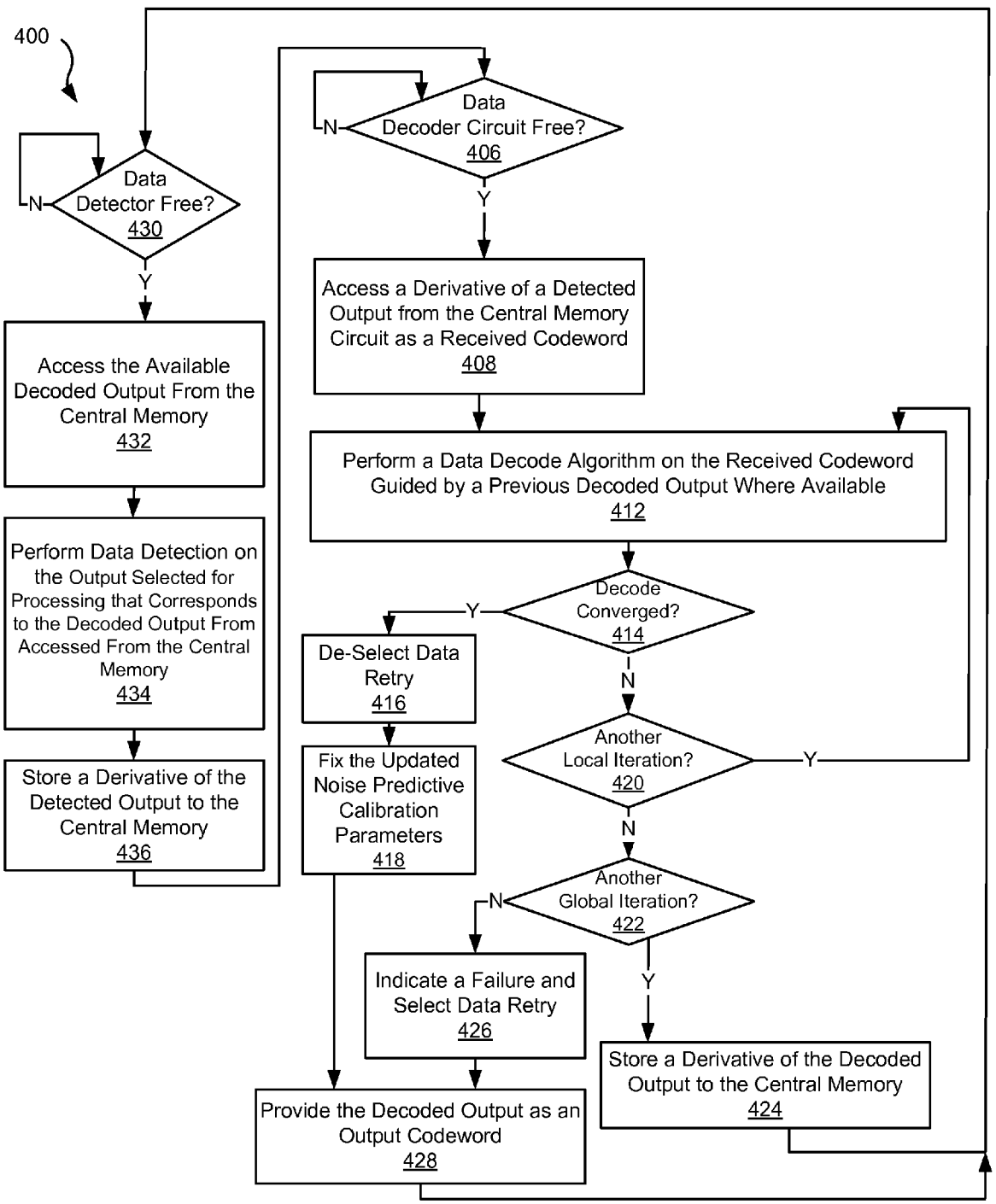

Turning to FIGS. 4a-4b, flow diagrams 400, 401 show a method for data processing utilizing X-average based re-adaptation in accordance with some embodiments of the present invention. Following flow diagram 401 of FIG. 4a, it is determined whether a retry condition is signaled (block 403). Such a retry condition is signaled, for example, where a codeword failed to converge during standard processing. Based upon the disclosure provided herein, one of ordinary skill in the art will recognize a variety of basis for asserting a retry condition. Where a retry condition is not signaled (block 403), standard processing is performed. Alternatively, where a retry condition is signaled (block 403), an analog input is received (block 405), analog front end processing is performed on the analog input using updated analog parameters (block 407), and converted to a series of corresponding digital samples using updated conversion parameters (block 409). The analog input may be derived, for example, from a storage medium or a transfer medium. Based upon the disclosure provided herein, one of ordinary skill in the art will recognize a variety of sources from which the analog input may be derived. The digital samples are equalized based at least in part on updated filter coefficients to yield a front end equalized output (block 413). As more fully described below, the updated front end filter coefficients, updated analog parameters, and updated conversion parameters are adaptively adjusted during multiple distinct phases to improve operation of the data processing. In addition, the digital samples are averaged with a prior X-average to yield updated X-average samples that are buffered (block 427). This X-averaging continues as multiple re-reads or retransmissions of a data set received as analog input is received.

During a first phase adaptation, loop SOVA processing is used to calculate updated analog parameters, updated conversion parameters, and updated front end filter coefficients (block 411). This process of adapting the updated analog parameters, updated conversion parameters, and updated front end filter coefficients (block 411) continues until a defined adaptation result is achieved (block 415). Once the defined adaptation result is achieved (block 417), the analog parameters, conversion parameters, and front end filter coefficients are fixed (block 417). The updated X-average samples are equalized to yield a front end equalized output based at least in part on the updated front end equalizer parameters (block 419). In some embodiments of the present invention, the front end equalization is performed by a digital finite impulse response filter.

A second phase adaptation begins with using loop SOVA processing to calculate updated back end filter coefficients based on the front end equalized output (block 421). The X-average samples are equalized using a back end equalizer circuit based at least in part on the updated back end filter coefficients (block 429). The back end equalized output is buffered as a Y-sample output (block 431). This second phase adaptation continues until a defined adaptation result is achieved (block 423). Once the defined adaptation result is achieved (block 423), the back end filter coefficients are fixed (block 425), and updating of noise predictive filter coefficients using loop SOVA processing is performed (block 437).

A data detection algorithm is applied to the buffered Y-sample output using the updated noise predictive filter coefficients to yield a detected output (block 433). The data detection algorithm may be, but is not limited to, a Viterbi algorithm or a maximum a posteriori data detection. Based upon the disclosure provided herein, one of ordinary skill in the art will recognize a variety of data detection algorithms that may be used in relation to different embodiments of the present invention. A derivative of the detected output is stored to a central memory (block 435). The derivative of the detected output may be, for example, an interleaved or shuffled version of the detected output.

Following flow diagram 400 of FIG. 4b, it is determined whether a data decoder circuit is available (block 406). The data decoder circuit may be, for example, a low density data decoder circuit as are known in the art. Where the data decoder circuit is available (block 406), a previously stored derivative of a detected output is accessed from the central memory and used as a received codeword (block 408). A data decode algorithm is applied to the received codeword to yield a decoded output (block 416). The data decode algorithm is guided, where available, a previous decoded output.

It is then determined whether the decoded output converged (e.g., resulted in the originally written data as indicated by the lack of remaining unsatisfied checks) (block 414). Where the decoded output converged (block 414), any previous selection of the retry condition (if any) is de-selected (block 416). This de-selection of the retry condition impacts block 403 of flow diagram 401 of FIG. 4a. In addition, the updated noise predictive calibration parameters are fixed (block 418), and the converged codeword is provided as a decoded output (block 428).

Alternatively, where the codeword failed to converge (block 414), it is determined whether another local iteration is desired (block 420). In some cases, as a default seven local iterations are allowed per each global iteration. Based upon the disclosure provided herein, one of ordinary skill in the art will recognize another default number of local iterations that may be used in relation to different embodiments of the present invention. Where another local iteration is desired (block 420), the data decode algorithm is re-applied using the current decoded output as a guide (block 412).

Alternatively, where another local iteration is not desired (block 420), it is determined whether another global iteration is allowed (block 422). As a default, another global iteration is allowed where there is sufficient available space in the central memory and an output memory reordering queue to allow another pass through processing the currently processing codeword. The amount of available space in the central memory and an output memory reordering queue is a function of how many iterations are being used by concurrently processing codewords to converge. For more detail on the output queue time limitation see, for example, U.S. patent application Ser. No. 12/114,462 entitled "Systems and Methods for Queue Based Data Detection and Decoding", and filed May 8, 2008 by Yang et al. The entirety of the aforementioned reference is incorporated herein by reference for all purposes. Thus, the amount of time that a codeword may continue processing through global iterations is a function of the availability of central memory and an output memory reordering queue. By limiting the number of global iterations that may be performed, the amount of time a codeword may continue processing through global iterations can be reduced.

Where another global iteration is allowed (block 422), a derivative of the decoded output is stored to the central memory (block 424). The derivative of the decoded output may then be re-processed through the data detection process and storage of the resulting detected output described above in relation to blocks 433, 435. As such, the adaptation of the updated noise predictive filter coefficients continues. Alternatively, where another global iteration is not allowed (block 422), a failure to converge is indicated (block 426), and the current decoded output is provided (block 428).

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing where one or more calibration processes may be suspended or coasted based upon determination of a defective data input. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the data processing system comprising:
   an analog to digital converter circuit operable to convert an analog input into a corresponding series of digital samples based at least in part on a conversion parameter;
   a sample averaging circuit operable to average the digital samples over multiple instances of the analog input to yield an X-average output;
   a selector circuit operable to select one of the digital samples or the X-average output as a processing output;
   an equalizer circuit operable to equalize the processing output to yield a Y-sample output based at least in part on an equalizer coefficient; and
   a data processing circuit operable to process the Y-sample output to recover a data set represented in the analog input based at least in part on a noise predictive filter coefficient.

2. The data processing system of claim 1, wherein the processing system further comprises:
   a phase based re-adaptation circuit operable to adapt the conversion parameter, the equalizer filter coefficient, and the noise predictive filter coefficient, wherein the conversion parameter is adapted while the analog input is being received and while the equalizer coefficient and the noise predictive filter coefficient are fixed.

3. The data processing system of claim 2, wherein the equalizer filter coefficient is adapted based on the X-average output while the noise predictive filter coefficient is fixed.

4. The data processing system of claim 3, wherein the noise predictive filter coefficient is adapted based on the Y-sample output.

5. The data processing system of claim 4, wherein the X-average output is fixed while the noise predictive filter coefficient is adapted.

6. The data processing system of claim 1, wherein the data processing circuit comprises:
   a data detector circuit operable to apply a data detection algorithm to the Y-sample output to yield a detected output; and
   a data decoder circuit operable to apply a data decoding algorithm to a decoder input derived from the detected output to yield the data set.

7. The data processing system of claim 6, wherein the data detection algorithm is governed at least in part by the noise predictive filter coefficient.

8. The data processing system of claim 6, wherein the data detector circuit is selected from a group consisting of: a maximum a posteriori data detector circuit, and a Viterbi algorithm data detector circuit.

9. The data processing system of claim 1, wherein the system is implemented as an integrated circuit.

10. The data processing system of claim 1, wherein the data processing system is incorporated in a device selected from a group consisting of: a storage device, and a data communication device.

11. A method for data processing, the method comprising:
converting an analog input into a corresponding series of digital samples using an analog to digital converter circuit based at least in part on a conversion parameter;
using a sample averaging circuit to average the digital samples over multiple instances of the analog input to yield an X-average output;
equalizing the X-average output to yield a Y-sample output based at least in part on an equalizer coefficient;
applying a data detection algorithm to the Y-sample output based at least in part on a noise predictive filter coefficient to yield a detected output;
adapting the conversion parameter using an adaptation circuit during a first phase using the digital samples, wherein the equalizer coefficient is fixed during the first phase; and
adapting the equalizer coefficient during a second phase using the X-average output, wherein the X-average output is fixed during the second phase.

12. The method of claim 11, wherein the method further comprises:
adapting the noise predictive filter coefficient during a third phase using the Y-sample output, wherein the Y-sample is fixed during the third phase, and wherein the third phase does not overlap the second phase.

13. The method of claim 11, wherein the data detection algorithm is selected from a group consisting of: a maximum a posteriori detection algorithm, and a Viterbi detection algorithm.

14. The method of claim 11, wherein the method further comprises:
applying a data decode algorithm to a decoder input derived from the detected output to yield a decoded output.

15. The method of claim 14, wherein the data decode algorithm is a low density parity check algorithm.

16. The method of claim 11, wherein the method further comprises:
reading and re-reading a storage medium to obtain the multiple instances of the analog input.

17. The method of claim 16, wherein reading and re-reading the storage medium to obtain the multiple instances of the analog input is performed during the first phase and not during the second phase.

18. The method of claim 11, wherein the noise predictive filter coefficient is also fixed during the first phase.

19. A storage device, the storage device comprising:
a storage medium;
a head assembly disposed in relation to the storage medium and operable to provide an analog input corresponding to information on the storage medium;
a data processing circuit including:
an analog to digital converter circuit operable to convert the analog input into a corresponding series of digital samples based at least in part on a conversion parameter;
a sample averaging circuit operable to average the digital samples over multiple instances of the analog input to yield an X-average output;
a selector circuit operable to select one of the digital samples or the X-average output as a processing output;
an equalizer circuit operable to equalize the processing output to yield a Y-sample output based at least in part on an equalizer coefficient; and
a data processing circuit operable to process the Y-sample output to recover a data set represented in the analog input based at least in part on a noise predictive filter coefficient.

20. The storage device of claim 19, wherein the data processing circuit further comprises:
a phase based re-adaptation circuit operable to adapt the conversion parameter, the equalizer filter coefficient, and the noise predictive filter coefficient, wherein the conversion parameter is adapted while the analog input is being received and while the equalizer coefficient and the noise predictive filter coefficient are fixed.

* * * * *